United States Patent
Sharma et al.

(10) Patent No.: US 12,205,614 B1
(45) Date of Patent: Jan. 21, 2025

(54) MULTI-TASK AND MULTI-LINGUAL EMOTION MISMATCH DETECTION FOR AUTOMATED DUBBING

(71) Applicant: Amazon Technologies, Inc., Seattle, WA (US)

(72) Inventors: Mayank Sharma, Bhopal (IN); Anil Kumar Nelakanti, Bangalore (IN); Palanivelu Balakrishnan, Bengaluru (IN); Saravanan Santhamoorthy Theckyam, Bangalore (IN); Honey Gupta, Patna (IN)

(73) Assignee: Amazon Technologies, Inc., Seattle, WA (US)

( * ) Notice: Subject to any disclaimer, the term of this patent is extended or adjusted under 35 U.S.C. 154(b) by 185 days.

(21) Appl. No.: 17/661,165

(22) Filed: Apr. 28, 2022

(51) Int. Cl.
| | |
|---|---|
| G10L 25/63 | (2013.01) |
| G06F 16/23 | (2019.01) |
| G06F 40/44 | (2020.01) |
| G06V 20/40 | (2022.01) |
| G10L 13/033 | (2013.01) |
| G10L 15/04 | (2013.01) |
| G10L 25/57 | (2013.01) |

(52) U.S. Cl.
CPC .............. G10L 25/63 (2013.01); G06V 20/40 (2022.01); G10L 15/04 (2013.01); G10L 25/57 (2013.01)

(58) Field of Classification Search
CPC ..... G06F 16/2365; G06F 40/44; G10L 13/033
USPC .......................................................... 704/2
See application file for complete search history.

(56) References Cited

U.S. PATENT DOCUMENTS

| | | | |
|---|---|---|---|
| 11,514,948 B1* | 11/2022 | Nair | G06F 16/2365 |
| 11,545,134 B1* | 1/2023 | Federico | G10L 13/033 |
| 2017/0040017 A1 | 2/2017 | Matthews et al. | |
| 2021/0390949 A1 | 12/2021 | Wang et al. | |
| 2023/0316007 A1* | 10/2023 | Shiratori | G06F 40/44 |
| | | | 704/2 |

FOREIGN PATENT DOCUMENTS

JP      WO/2019/111346      *    6/2019    ............. G06F 17/28

OTHER PUBLICATIONS

Baevski, A. et al., "wav2vec 2.0: a Framework for Self-Supervised Learning of Speech Representations", Facebook AI, Oct. 22, 2020, pp. 1-19.
Bulat, A. et al., "How far are we from solving the 2D & 3D Face Alignment problem? (and a dataset of 230,000 3D facial landmarks)", In Proceedings of the IEEE International Conference on Computer Vision, 2017, pp. 1021-1030.
(Continued)

*Primary Examiner* — Farzad Kazeminezhad
(74) *Attorney, Agent, or Firm* — Weaver Austin Villeneuve & Sampson LLP

(57) ABSTRACT

Methods and apparatus are described for evaluating dubbing of media content. Emotions are identified based on combinations of attributes determined for segments of a source language audio and a dubbed audio. The emotions may be compared to determine emotional prosody transfer between the source audio and dubbed audio. Based on the comparison, a notification is generated indicating whether an emotion classification associated with the source audio matches an emotion classification associated with the dubbed audio.

20 Claims, 4 Drawing Sheets

(56) References Cited

OTHER PUBLICATIONS

Chung, J.S. et al., "Out of Time: Automated Lip Sync in the Wild", In Asian conference on computer vision, (pp. 251-263), Nov. 2016, 4 pages.
Mcauliffe, M. et al., "Montreal Forced Aligner: Trainable Text-speech Alignment Using Kaldi", Paper, 2017, 5 pages.
U.S. Appl. No. 17/804,517, inventors Gupta filed on May 27, 2022.
U.S. Final Office Action dated Mar. 15, 2024 in U.S. Appl. No. 17/804,517.
U.S. Non-Final Office Action dated Nov. 16, 2023 in U.S. Appl. No. 17/804,517.

\* cited by examiner

MULTI-TASK AND MULTI-LINGUAL EMOTION MISMATCH DETECTION FOR AUTOMATED DUBBING

BACKGROUND

Users have an ever-increasing array of options for consuming media presentation, in terms of the types of media presentation (e.g., video, audio, etc.), providers of the media presentation, and devices for consuming the media presentation. Media presentation providers are becoming increasingly sophisticated and effective at providing media presentation quickly and reliably to users.

Users may understand various languages and prefer to consume content in a familiar language with dubbed audio. Dubbing audio may be performed using automation or with human speakers. Unfortunately, dubbed audio may not convey the same emotions as the original audio, leading to a confusing user experience as the audio does not match the context of the corresponding video.

DETAILED DESCRIPTION

This disclosure describes techniques for evaluating emotional prosody transfer between original audio content and dubbed audio content. A clip of source audio in a source language may be transcribed, translated, and dubbed into speech of a target language. This dubbing may be performed manually or by automated methods. The source audio and the dubbed audio may be individually analyzed to determine emotions of the source audio and the dubbed audio. The emotions of the source audio and the dubbed audio may be compared to determine the similarity of the emotions. If the emotions are not similar, then the dubbed audio may be re-dubbed or the dubbing process modified to improve emotional similarity. An example may be instructive.

Figure 1:
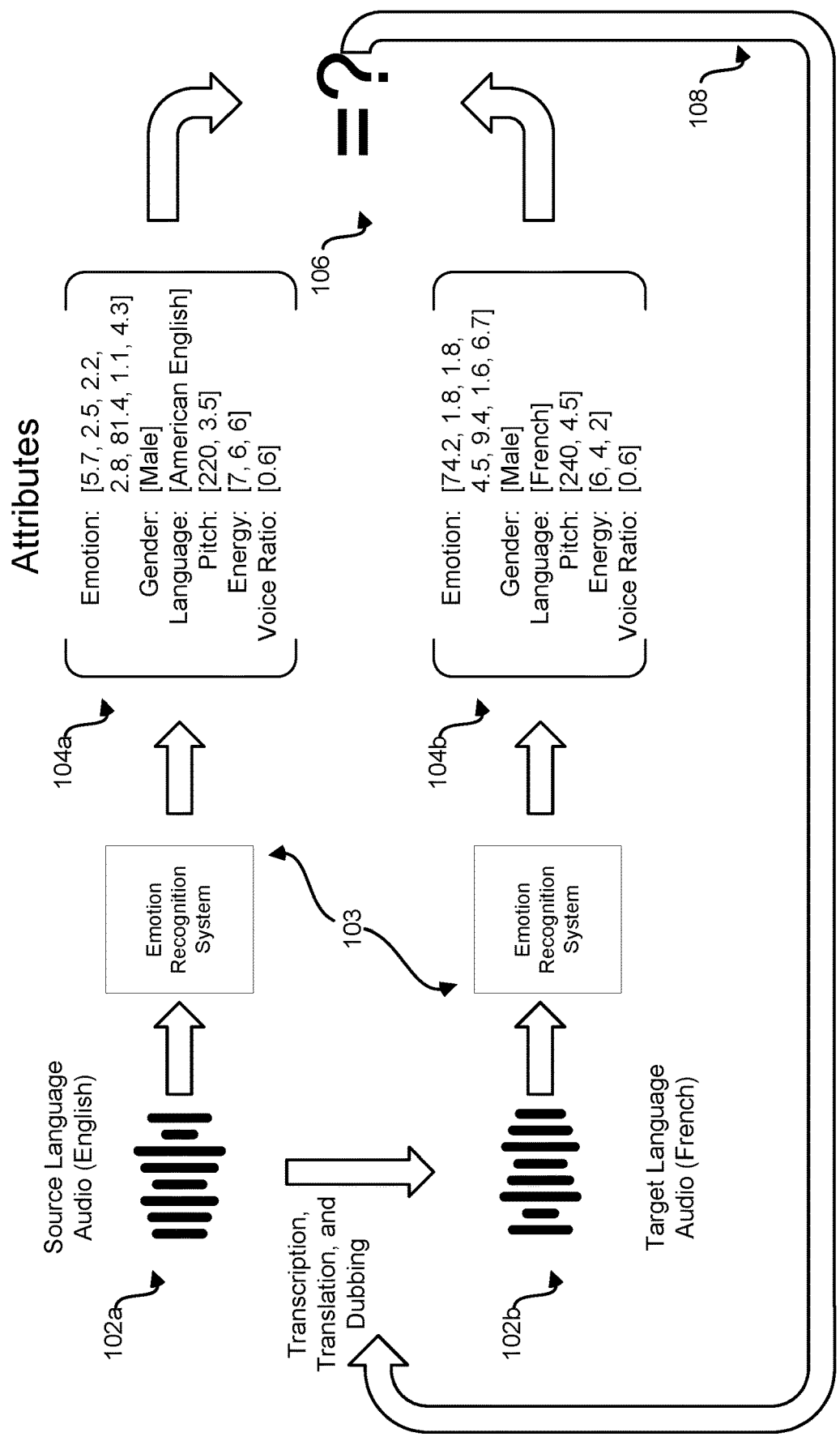
FIG. 1 presents a flow diagram of an operation for one example embodiment.

FIG. 1 presents an illustration of a dubbing emotion check system. A source language audio 102*a* may be part of a media presentation. The source language audio 102*a* may be dubbed into a target language audio 102*b*. The source language audio may be in, e.g., English, while the target language audio is, e.g., French. The dubbing process may be performed automatically or manually. In an automatic process, dubbing may occur as a process that includes transcribing the source audio, translating the transcription into a target language, and then dubbing the transcription into target language audio using a text-to-speech module. This may involve using one or more trained models.

The source language audio and the target language audio are each provided to an emotion recognition system 103. Details of the emotion recognition system are discussed further herein. The emotion recognition system may include one or more trained models that receive an audio file as input and output attributes of the audio, notably an emotion classification. The emotion recognition system 103 may be trained to classify emotions for multiple languages. Thus, in some embodiments, the same emotion recognition system is used to classify source language audio and target language audio.

The emotion recognition system 103 outputs attributes 104*a* and 104*b* of the source language audio and target language audio, respectively. As shown in FIG. 1, the attributes may include multiple attributes, including emotion, gender, language, pitch, energy, and voice ratio. Emotion attributes may include a probability that the corresponding audio contains an emotion. FIG. 1 presents 7 different emotions (where the probabilities of each emotion add to 100%): happy, anger, fear, neutral, surprise, sad, disgust. More or fewer emotions may be classified. Assuming the previous list corresponds to the vector shown in FIG. 1, attributes 104*a* classify the source language audio as surprise (81.4%). Attributes 104*b*, by contrast, classify the target language audio as happy (74.2%).

The emotion of source language audio 102*a* and target language audio 102*b* may then be compared (106). In some embodiments, the highest probability emotion is selected for each audio and used for the comparison. In FIG. 1, source language audio is classified as surprise, while target language audio is classified as happy. As these do not match, a notification may be generated to signal that the target language audio 102*b* does not match the source language audio 102*a*. In some embodiments, attributes 104*a* and 104*b* may then be used as feedback to improve the transcription, translation, and/or text-to-speech process, as shown by arrow 108. In other embodiments, the notification may be a prompt for further review of the dubbing by a human operator. The human operator may then review the dubbing process to determine any sources of error that contribute to the non-matching emotion classifications.

In some embodiments, only the emotion attribute is compared between the source language audio and the target language audio. Other attributes, e.g., gender, language, pitch, energy, and voice ratio, may act as auxiliary tasks that improve the emotion recognition system's emotion prediction by tuning one or more embedding layers of a model in the emotion recognition system. For example, men generally have a lower pitch than women when speaking, even for the same emotions. Furthermore, high pitch is generally correlated with excited or shouting states, while low pitch is generally correlated with sad or pensive emotions. Training the emotion recognition system to classify a gender of a speaker may improve emotion classification as the emotion recognition system does not erroneously conflate a male speaker having a low-pitched voice with a sad emotion.

In other embodiments, non-emotion attributes may also be compared. For example, the classified gender or language of the target language audio should match the classified gender or language of the corresponding source language audio. If these attributes do not match, that may indicate a mis-match in the emotions of the source language audio and the target language audio, even if the classified emotions for both match. Other combinations of attributes may be evaluated to determine whether the emotions of the source language audio and the target language audio sufficiently match.

Figure 2:
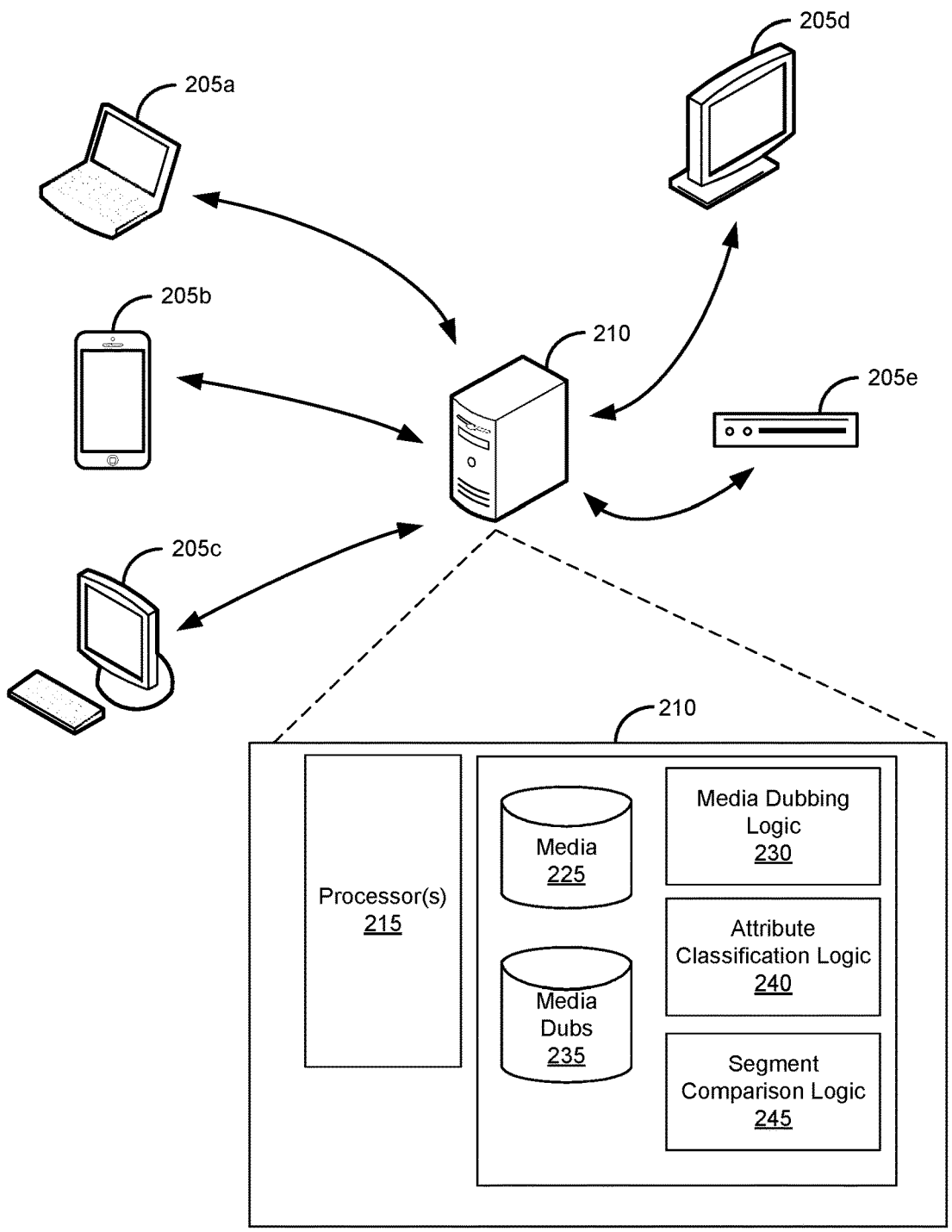
FIG. 2 presents an illustration of one example embodiment.

FIG. 2 illustrates an example of a computing environment in which source language audio and target language audio may be compared as enabled by the present disclosure. The computing environment of FIG. 2 includes media server 210 which can be used to provide a media presentation for playback on devices 205*a-e*.

It should be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media presentations herein is merely by way of example. Suitable alternatives known to those of skill in the art may be employed.

Media server 210 may be part of a content delivery system that conforms to any of a wide variety of architectures. The functionality and components of media server 210 can use one or more servers and be deployed at one or more geographic locations (e.g., across different countries, states, cities, etc.) using a network such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc.

Media server 210 can include various types of logic used to provide media presentations for playback at devices 205a-e. In FIG. 2, media server 210 includes media presentation storage 225 and media dubs storage 235. Media server 210 also includes media dubbing logic 230, attribute classification logic 240, and segment comparison logic 245.

Media presentation storage 225 stores a variety of media presentations for playback on devices 205a-e, such as episodes of television shows, movies, music, etc. Media dubs storage 235 can be a storage mechanism, such as a database, storing audio dubs of media presentations in target languages other than the source audio of the media presentations. For example, various language dubs of every episode of a television show stored in media presentation storage 225 can be stored in media dubs storage 235.

In certain implementations, at least some of the contents of media dubs storage 235 may be generated automatically. For example, source language audio may be automatically transcribed to text and translated into a target language. Target language audio may then be generated based on the translated text using an automatic text-to-speech module. In some embodiments, media dubbing logic 230 may be used to automatically transcribe, translate, and generate target language audio from source language audio. In other embodiments, dubbing may be performed by a human operator.

Media server 210 also can include one or more processors 215, memory, and other hardware for performing the tasks and logic disclosed herein. Attribute classification logic 240 performs tasks relating to identifying segments from media presentations and determining attributes of segments for source language audio and target language audio. Segment comparison logic 245 performs tasks relating to comparing source language audio and target language audio. Attribute classification logic 240 can interface to segment comparison logic 245. For example, segment comparison logic 245 may receive attributes from attribute classification logic 240 or embedded layer features.

Figure 3:
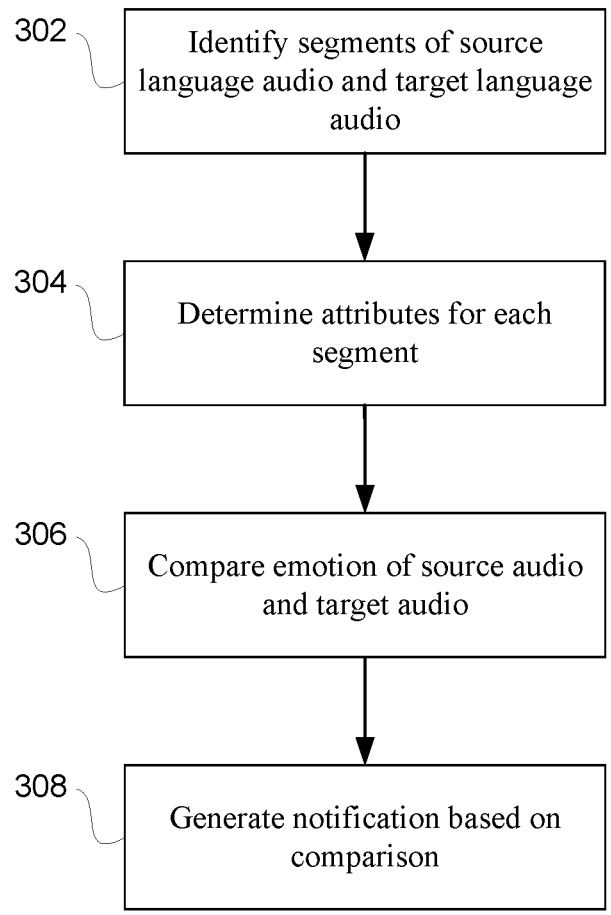
FIG. 3 presents a flow diagram for comparing emotions of source language audio and dubbed audio.

A specific implementation in which one or more audio files are analyzed for attributes will now be described with reference to the computing environment of FIG. 2 and the flow diagram of FIG. 3. Segments of source language audio and target language audio are identified (302). In some embodiments, segments can be between 500 ms and 10 seconds, or between 700 ms and 8 seconds. In some implementations, a segment can be about 6 seconds (e.g., 5 to 7 seconds) in duration. In some implementations, segments may have the same duration, while in other implementations segments may have different durations that correspond to detected speech. In some embodiments, segments are based on detected speech in a media presentation. This may improve efficiency by not analyzing portions of the source language audio and target language audio where dubbing is not present. In some implementations segments may be determined based on scene boundaries. As speech typically does not cross a scene boundary, detecting speech from the start of a speech boundary may correspond with a single speaker and a single emotion. In some implementations, segments may be determined based on a dialogue boundary, e.g., a boundary between one or more speakers in a dialogue.

Attributes are determined for each segment (304). Attributes may include one or more attributes discussed in relation to FIG. 1, above. In some embodiments, attributes may include an emotion classification, a gender classification, a language classification, a pitch, an energy, and/or a voice ratio. In some embodiments emotion classification may be based on one of seven emotions: happy, anger, fear, neutral, surprise, sad, disgust. More or fewer emotions may be classified. For example, Plutchik's wheel of emotions provides 30+ emotions. In some embodiments, attributes may be an audio embedding in a hidden layer of a machine learning model. In some embodiments, attributes are determined using a machine learning model as described in FIG. 4.

In some embodiments, attributes may also include non-emotion attributes including gender classification, language classification, pitch, energy, and voice ratio. Gender classification may share mutual features with emotion classification, such as pitch of male/female speakers and pitch of happy/sad emotions. Language classification may share mutual features with emotion classification as different languages intonate differently to convey certain emotions. In some embodiments, language classification may also include geographic or cultural differences. For example, Brazilian Portuguese may differ in how emotions are intonated compared to European Portuguese. As the model may be used to classify emotions of a source language and a target language, adding a language prediction task may help the model learn the intonation of individual languages. In some embodiments, pitch may share mutual features with emotion classification. For example, high pitch is attributed with excited and shouting states, whereas low pitch is generally related to sad and pensive states. $F_0$ mean and standard deviation for pitch may be determined as an auxiliary task. In some embodiments, Yin's algorithm may be used to predict a $F_0$ contour, and then a model may predict the mean and standard deviation of $F_0$ for a given segment. In some embodiments, energy may share mutual features with emotion classification. In some embodiments, emotions can be categorized in three dimensions of valence, activation and dominance. High energy is usually associated with positively dominant emotions, such as anger and excitement. Low energy is associated with negatively dominant fear and sadness. Thus, in some embodiments a mean and standard deviation of segment energy may be determined as an auxiliary task to improve emotion classification. In some embodiments, voice ratio may be used with emotion classification. In some embodiments, segments of speech may have a variable length, and an auxiliary task may include predicting a voice ratio of segments.

Figure 4:
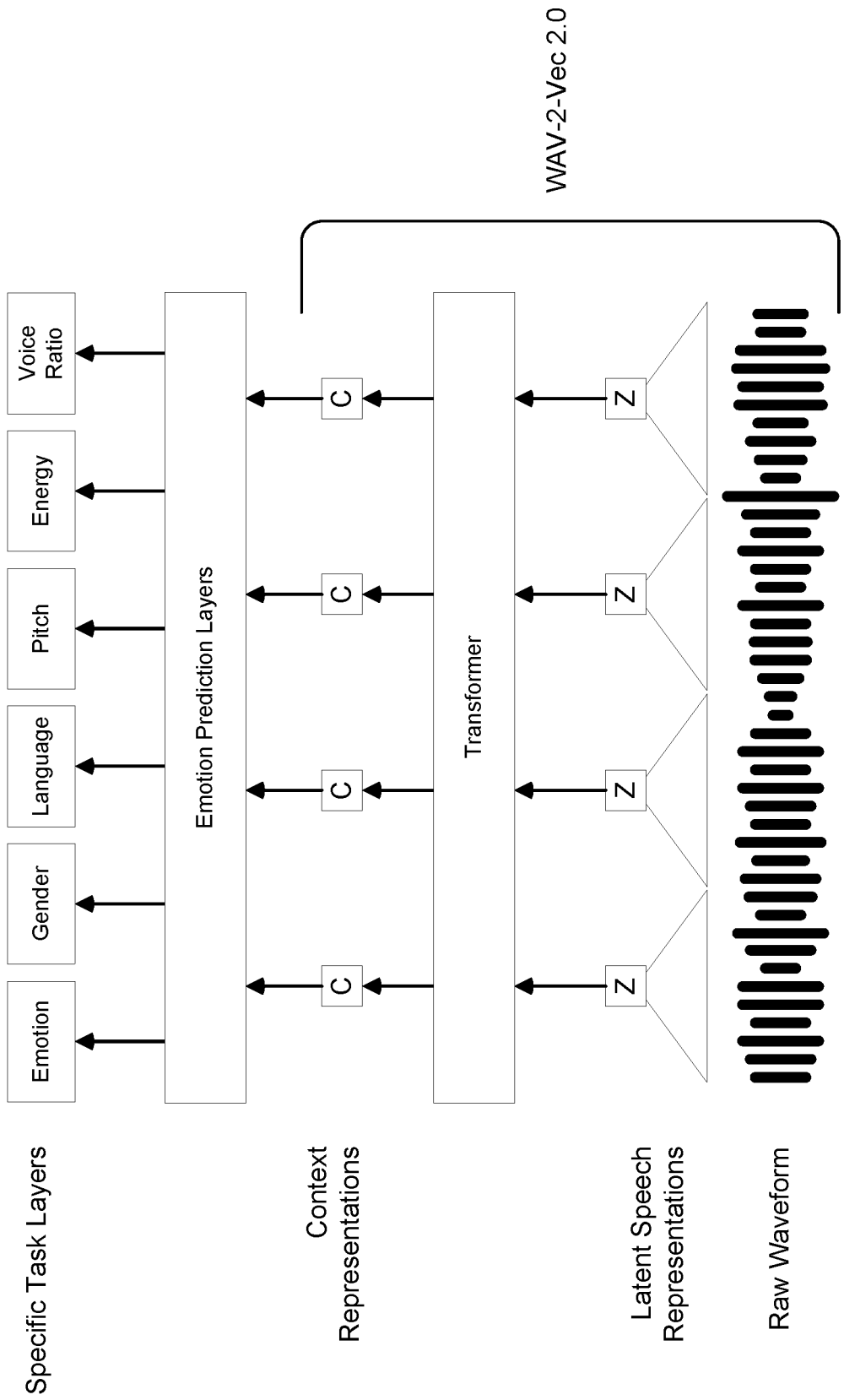
FIG. 4 presents a model architecture for determining emotions and other attributes of speech audio as described herein.

FIG. 4 describes a model architecture for an emotion recognition system according to various embodiments herein. In some embodiments, a wav2vec 2.0 model is used for at least part of the emotion recognition system. Wav2vec 2.0 is a model that receives as an input a raw waveform and outputs context representations of the waveform, which may then be fed into an additional model. Wav2vec 2.0 may initially be trained on unlabeled speech. One or more layers of a convolutional feature encoder, such as a convolutional neural network (CNN), may process the raw waveform and determine latent speech representations (Z), which may be a feature vector for some sampled duration of audio, e.g., 20 milliseconds. A transformer may then convert the latent speech representations into context representations. During initial training, the latent speech representations may be quantized, and a transformer model is trained to predict the quantized features. This initial training may use unlabeled data. Once trained, the transformer may output context representations of the speech that may then be fed into an additional model. The additional model may then be trained using the context representations generated by the trained wav2vec 2.0 model using labelled data. In some embodiments, the context representations may have more than about 700 dimensions for each audio sample. While wav2vec 2.0 has been described here, in some embodiments other models may be used for generating initial context representations, e.g., HuBert, WavLM, or convolutional neural networks based on ImageNet or Google Audioset. In some embodiments, any models that may generate context representations from audio samples may be used, e.g., a convolutional neural network and a transformer.

The context representations may be provided to emotion prediction layers. Emotion prediction layers may include one or more layers, including dense layer heads of a CNN, long short-term memory (LSTM) network layers, and/or global time dimension average pool layers. In some embodiments, one or more layers of the emotion prediction layers may have more dimensions than the context representations, e.g., more than about 1000 or more than about 2000 dimensions. The emotion prediction layers may be shared amongst tasks, e.g., emotion classification, gender classification, and language classification. In some embodiments, the emotion prediction layers may feed into individual task models to determine each of emotion, gender, language, pitch, energy, and/or voice ratio. In some embodiments, the emotion prediction layers may be used as attributes for comparing source language segments and target language segments, as described further below.

Depending on the implementation, a variety of different classifiers types and neural network models may be employed including, for example, tree-based ensemble classifiers (e.g., RandomForest, GradientBoost, and XGBoost), support vector machines, Gaussian process classifiers, and neural network models such as the LSTM, 3D-CNN and LSTM-CNN models, and k-nearest-neighbors (kNN) models. Once trained, a classifier may be used to associate new audio samples with an emotion, gender, or language.

The models for determining context representations may be trained separately from the emotion prediction layers. In some embodiments, the models for determining context representations are frozen, i.e. not further trained, during training of the emotion prediction layers.

In some embodiments, the non-emotion tasks may function as auxiliary tasks. Auxiliary tasks are tasks that a model is trained to perform that improves the model's ability to perform a separate, primary task, e.g., emotion classification. In some embodiments, layers of a neural network that are shared between an emotion classification task and an auxiliary task may have improved representations of emotions by learning to also represent the auxiliary task, e.g., gender. Thus, as shown in FIG. 4, in some embodiments emotion prediction layers may have improved representations of emotions, and thus improve emotion classifications output by the emotion classification task, based on training to also predict gender, language, etc. In some embodiments, auxiliary tasks may not be used for comparing source audio and dubbed audio. In some embodiments, auxiliary tasks may also be used in addition to emotion for comparing source audio and dubbed audio.

In some embodiments, an emotion recognition system may be trained for emotion classification and one or more auxiliary tasks as described above. In some embodiments, an emotion recognition system may be trained to generate an emotion classification, a gender classification, and a language classification. While a model may be trained to generate multiple attributes, in some embodiments less than all attributes are used to compare source language audio and target language audio, e.g., only the emotion classification is used for comparisons. However, the emotion classification is improved by virtue of the model being trained to generate other attributes (or generate an embedding fed into a model that produces such attributes), even if such other attributes are not used for comparison.

In some embodiments, the ensemble of models illustrated in FIG. 4 may be trained using multi-lingual datasets. Using multilingual datasets may allow the model to generalize over languages, such that a single model may be used to determine emotions in source audio and target language audio. In some embodiments, multilingual datasets may include data labelled with emotions, gender, and/or language, which may be used to train classifiers for emotions, gender, and/or language, respectively. In some embodiments, pitch, energy, and voice ratio may be calculated for the multilingual datasets based on the audio samples.

In some embodiments, the models of FIG. 4 may generate emotion classifications additionally based on video content. For example, facial expressions may indicate emotions within video content that corresponds to the audio content. Thus, in some embodiments, the models may be additionally trained to determine emotions based on video content. In some embodiments, only the source language audio may be augmented using video content, as the facial expressions would correlate with the source language.

Returning to FIG. 3, emotion classifications for each segment of the source audio and the target audio are compared (306). In some embodiments, this comparison may be based on the emotion classifications for the source audio and the target audio. In some embodiments, the emotion classification is the highest probability emotion output by a machine learning model. In some embodiments, the comparisons may be based on an embedding layer of a model used to determine emotion classifications. While emotions may be classified into broader categories of, e.g., angry, in some embodiments finer grain emotions may be expressed, such as annoyance, aggressiveness, or contempt. For example, Plutchik's wheel of emotions provides 30+ emotions. In some embodiments, one or more embedding layers may contain audio embeddings that correspond to such finer grain emotions, e.g., one of the emotion prediction layers shown in FIG. 4. Thus, in some embodiments, the audio embeddings for the source language audio and the target language audio are compared to determine a similarity between the embeddings for dimensions of a single emotion prediction layer. In some embodiments, the similarity is determined using a cosine similarity. If the cosine similarity exceeds a threshold, e.g., 0.5, then the emotions of the source language audio and the target language audio may be determined to be the same. Other thresholds may be used. Conversely, if the cosine similarity does not exceed the threshold, the emotions may be determined to be dissimilar. In some embodiments, other methods of comparing similarities between embedding layers of a neural network or other machine learning models may be used.

In some embodiments, other attributes than emotions may additionally be compared. For example, the gender and/or language of the source language audio and the target language audio may be compared. A mismatch of the gender and/or language may indicate the emotions are also mismatched, even if the emotion classifications otherwise match or are similar.

A notification may be generated based on the comparison (308). In some embodiments, the notification may signal a human operator to manually verify and correct the dubbing in the target language audio. In some embodiments, the notification may be used as feedback to an automated dubbing module that generates the target language audio. In some embodiments, the notification may include one or more attributes of the source audio language and the target audio language as feedback to the automated dubbing module.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A method, comprising:
   receiving a source language audio;
   partitioning the source language audio into first speech segments;
   determining attributes of each first speech segment using a machine learning model, wherein the attributes of each first speech segment include a first emotion classification;
   receiving a target language audio based on the source language audio;
   partitioning the target language audio into second speech segments;
   determining attributes of each second speech segment using the machine learning model, wherein the attributes of each second speech segment include a second emotion classification;
   comparing the first emotion classification and the second emotion classification;
   based on the comparison, generating a notification indicating whether the first emotion classification matches the second emotion classification.

2. The method of claim 1, wherein the attributes additionally comprise gender classification, language classification, pitch, energy, voice ratio, or combinations thereof.

3. The method of claim 1, wherein the machine learning model is trained to determine a gender of a speaker in an audio file and a language of speech in an audio file.

4. The method of claim 1, wherein a duration of each of the first speech segments and second speech segments are between 500 ms and 10 seconds.

5. A method, comprising:
   receiving a source language audio;
   partitioning the source language audio into first speech segments;
   determining first emotion attributes for the first speech segments;
   receiving a target language audio based on the source language audio;
   partitioning the target language audio into second speech segments;
   determining second emotion attributes for the second speech segments;
   comparing the first emotion attributes and the second emotion attributes;
   based on the comparison, generating a notification indicating whether the first emotion attributes match the second emotion attributes for each of the first speech segments and the second speech segments.

6. The method of claim 5, further comprising determining first emotion attributes of each first speech segment using a machine learning model and determining second emotion attributes of each second speech segment using the machine learning model.

7. The method of claim 6, wherein the machine learning model is trained to determine a gender of a speaker in an audio file and a language of speech in an audio file.

8. The method of claim 6, wherein the machine learning model is trained to determine a pitch of speech, an energy of speech, a voice ratio of speech, or any combination thereof in an audio file.

9. The method of claim 6, wherein the first emotion attributes and the second emotion attributes correspond to a hidden layer of the machine learning model, and wherein the method further comprises determining a cosine similarity between the first emotion attributes for each first speech segment and the second emotion attributes for each second speech segment, wherein the notification is additionally based on the cosine similarity.

10. The method of claim 5, wherein the first emotion attributes comprise a first emotion classification, and the second emotion attributes comprise a second emotion classification.

11. The method of claim 5, further comprising providing the first emotion attributes and second emotion attributes as feedback to an automatic dubbing module that generated the target language audio.

12. The method of claim 5, further comprising determining the first emotion attributes and the second emotion attributes based on video content corresponding to the first speech segments and the second speech segments.

13. A system, comprising one or more memories and one or more processors configured for:
   receiving a source language audio;
   partitioning the source language audio into first speech segments;

determining first emotion attributes for the first speech segments;

receiving a target language audio based on the source language audio;

partitioning the target language audio into second speech segments;

determining second emotion attributes for the second speech segments;

comparing the first emotion attributes and the second emotion attributes;

based on the comparison, generating a notification indicating whether the first emotion attributes match the second emotion attributes for each of the first speech segments and the second speech segments.

14. The system of claim 13, wherein the one or more memories and one or more processors are further configured for determining first emotion attributes of each first speech segment using a machine learning model and determining second emotion attributes of each second speech segment using the machine learning model.

15. The system of claim 14, wherein the machine learning model is trained to determine a gender of a speaker in an audio file and a language of speech in an audio file.

16. The system of claim 14, wherein the machine learning model is trained to determine a pitch of speech of an audio file, an energy of speech of an audio file, a voice ratio of speech in an audio file, or any combinations thereof.

17. The system of claim 14, wherein the first emotion attributes and the second emotion attributes correspond to a hidden layer of the machine learning model, and wherein the one or more memories and one or more processors are further configured for determining a cosine similarity between the first emotion attributes for each first speech segment and the second emotion attributes for each second speech segment, wherein the notification is additionally based on the cosine similarity.

18. The system of claim 13, wherein the first emotion attributes comprise a first emotion classification, and the second emotion attributes comprise a second emotion classification.

19. The system of claim 13, wherein the one or more memories and one or more processors are further configured for providing the first emotion attributes and second emotion attributes as feedback to an automatic dubbing module that generated the target language audio.

20. The system of claim 13, wherein the one or more memories and one or more processors are further configured for determining emotion attributes based on video content corresponding to the first speech segments and the second speech segments.

* * * * *